D. B. Hart,
Nut & Washer,
Nº 67,539. Patented Aug. 6, 1867.
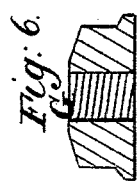
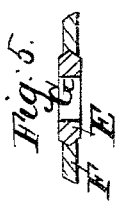
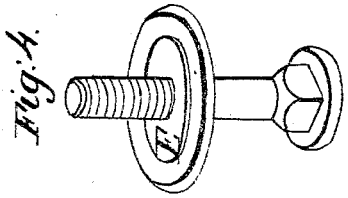
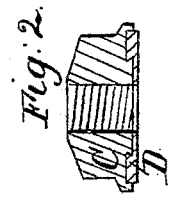
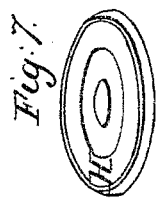
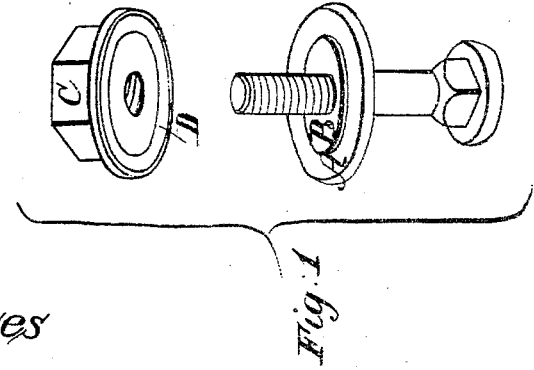
Witnesses
J. F. Single
M. S. Harvey
Inventor;
D. B. Hart

United States Patent Office.

D. B. HART, OF MENTOR, OHIO.

*Letters Patent No. 67,539, dated August 6, 1867.*

---

IMPROVEMENT IN NUTS AND WASHERS.

---

*The Schedule referred to in these Letters Patent and making part of the same.*

---

TO ALL WHOM IT MAY CONCERN:

Be it known that I, D. B. HART, of Mentor, in the county of Lake, and State of Ohio, have invented a new device for Bolt-Nuts and Washers, to prevent their becoming loose; and I do hereby declare that the following is a full and exact description thereof, reference being had to the accompanying drawings, in which—

Figure 1 represents a nut and washer provided with my said device.

Figures 2 and 3, central vertical sections of the same.

Figure 4, perspective view showing a washer having a modification of the same device.

Figures 5 and 6, central vertical sections of said washer and a plain nut.

Figure 7, perspective view of a washer having another modification of same device, and used with a plain nut, and Figure 8, a central vertical section of said washer.

The same letters of reference indicate similar parts.

The loosening of bolt-nuts is a fruitful source of complaint with those who use machinery. Farmers, especially, are often annoyed by the nuts of their farming implements becoming loose and deranging the parts. Oftentimes nuts drop off and are lost, frequently involving a serious loss from stoppage of work.

The object of this invention is a device by which the evil can be effectually remedied. It consists in forming a groove, channel, or chamber in the washer commonly used on bolts, or in the washer and nut combined, and filling said channel with an India-rubber or other elastic packing, and so as that it (the packing) will not spread laterally outward, or arranging it so that, if desirable, said packing may spread laterally inward and press against the sides of the bolt; and thus afford additional hold, as will be explained. The main object of the invention being to confine said packing so as not to spread outward, thereby insuring a vertical elasticity when pressed by the screwing down of the nut and thus prevent all possibility of its turning back and becoming loose.

The following description will show the construction and operation of my said device:

A, fig. 1, is a metallic washer, and B the elastic packing in the sunk channel thereof. This channel or chamber is shown in fig. 3, and is, it will be observed, of a flaring or dove-tailed form for the better holding the packing in place. The nut C is also prepared with such a channel, D, for receiving packing. Fig. 2 shows the form of it. The object in using flaring or dove-tailed sides in the channels or apertures of the washer or nut, is to retain the packing so as to prevent its easily slipping out. But straight-sided channels or apertures can be used to prevent packing spreading, except when it is required to do so inwardly.

The above description fully illustrates the principle of my said device; but in order to meet all mechanical variations, which will embody the said principle, and to provide for particular uses, I here illustrate three additional forms: Fig. 4 and its section, fig. 5, show that the packing may be confined within a central aperture, E, having a V-shaped form of channel, F, and a hole, G, through it for the bolt, so that the nut, fig. 6, (which is a plain one, having no packing,) when it presses on said packing, will spread around the bolt and give additional hold, as seen. Fig. 7 is the other form; in this the washer has a sunk flaring channel, H, to receive the packing, as seen in the section, fig. 8; a plain nut, fig. 5, being used.

My said device is thus used: When the bolt, as represented in fig. 1, is in its place, the washer A is put on and the nut C screwed down. It will be seen that, in tightening the nut, the elasticity of the packing, by its not spreading, will always be in firm contact with the face of the washer, and, by its peculiar adhesion, prevent its turning back, unless by force purposely applied; and also that the packing B, in the centre of the said washer, will spread towards and around the shaft of the bolt, thus giving additional hold. The other form, as delineated in figs. 4, 5, and 6, and used with a plain nut, presses on the central packing, and spreads in the same way around the bolt. The remaining form, figs. 7 and 8, has the packing of the washer so arranged, as shown, as not to spread outward or inward. This and the preceding form will meet most cases; but the first may be adopted when extra adhesion is required.

What I claim as my invention, and desire to secure by Letters Patent, is—

The within-named device, constructed and operating as described, or its equivalent, as a new and original mode for the purpose set forth, and used in either or all of the forms herein delineated and described.

D. B. HART.

Witnesses:
J. F. SINGLE,
M. S. HARVEY.